United States Patent [19]
Allen

[11] 3,840,959
[45] Oct. 15, 1974

[54] COMPENSATING PLUNGER FOR SOLENOID VALVE AND METHOD OF MAKING
[75] Inventor: Walter E. Allen, Prospect, Conn.
[73] Assignee: Peter Paul Electronics, New Britain, Conn.
[22] Filed: Mar. 19, 1973
[21] Appl. No.: 342,690

Related U.S. Application Data
[62] Division of Ser. No. 151,811, June 10, 1971, Pat. No. 3,733,047.

[52] U.S. Cl................ 29/157.1 R, 29/434, 29/450
[51] Int. Cl............................................ B21d 53/00
[58] Field of Search...................... 29/157.1 R, 434; 137/625.5, 625.48, 434; 251/141, 357, 358

[56] References Cited
UNITED STATES PATENTS

| | | | |
|---|---|---|---|
| 2,893,687 | 7/1959 | Huthsing, Sr. | 251/357 |
| 2,976,010 | 3/1961 | Huthsing, Sr. | 251/358 |
| 3,025,874 | 3/1974 | Yocum | 251/357 |
| 3,043,336 | 7/1962 | Parent et al. | 137/625.5 |
| 3,172,637 | 3/1965 | Adams et al. | 137/625.5 |
| 3,185,177 | 5/1965 | Brandenberg et al. | 137/625.27 |
| 3,199,186 | 8/1965 | Simpson | 29/450 |
| 3,351,093 | 11/1967 | Frantz | 137/625.27 |
| 3,588,979 | 6/1971 | Miller | 29/450 |

Primary Examiner—Charles W. Lanham
Assistant Examiner—Dan C. Crane
Attorney, Agent, or Firm—McCormick, Paulding & Huber

[57] ABSTRACT

A fluid control valve for an hydraulic system and having a compensating plunger movable in response to energization of a solenoid to alter the path of hydraulic fluid flow through the valve. The plunger is generally cylindrical and has a bore extending axially therethrough and containing elastomeric inserts at opposite ends thereof. Each insert has a seating surface for sealing engagement with a respectively associated valve seat. One of the inserts is movable relative to the plunger and spring biased to its seating position. The inserts are constructed and arranged so that the portion of each insert which defines the seating surface thereof is substantially free of internal stress.

6 Claims, 9 Drawing Figures

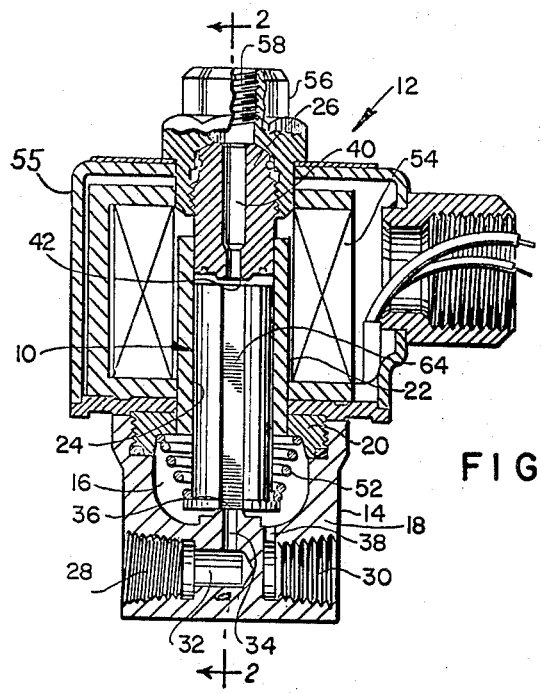
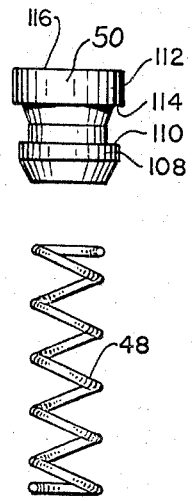
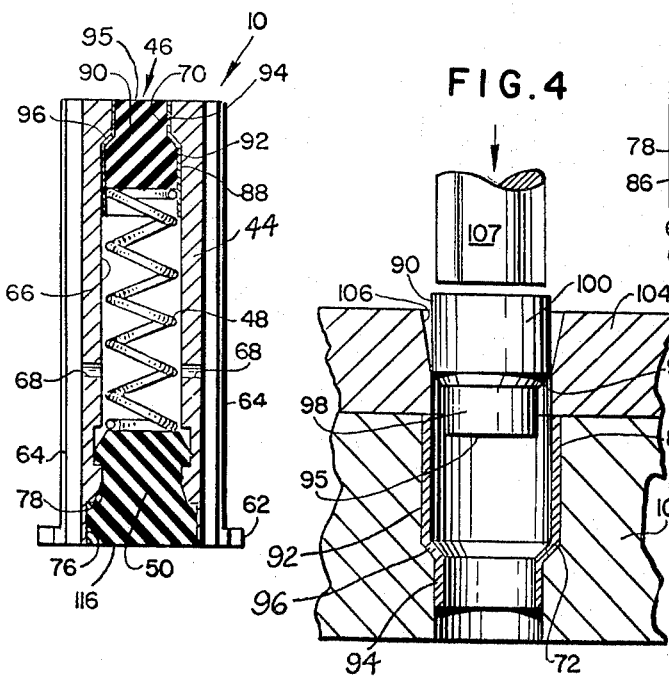
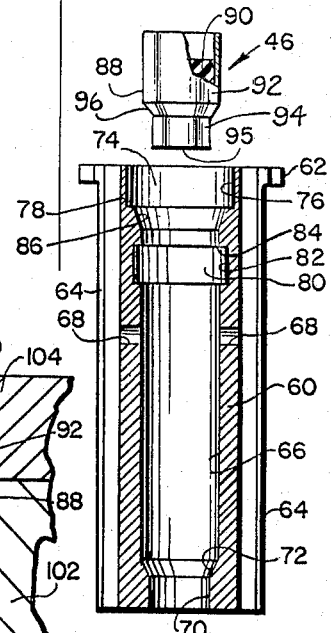
FIG. 1
FIG. 3
FIG. 2
FIG. 4

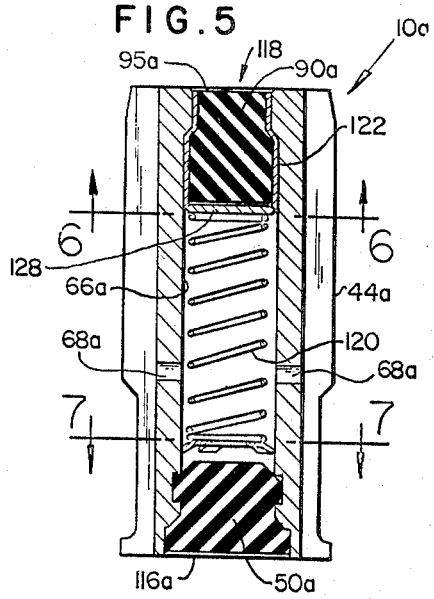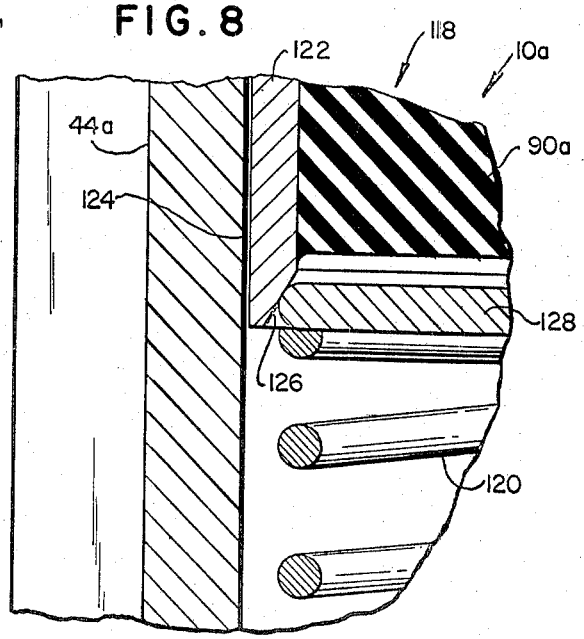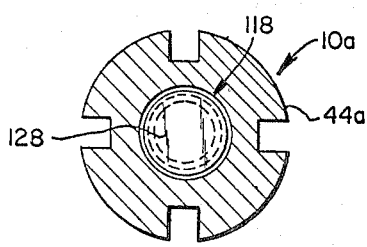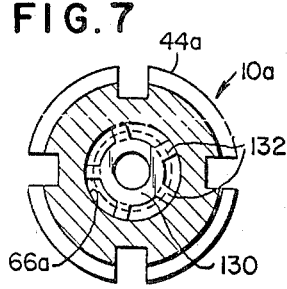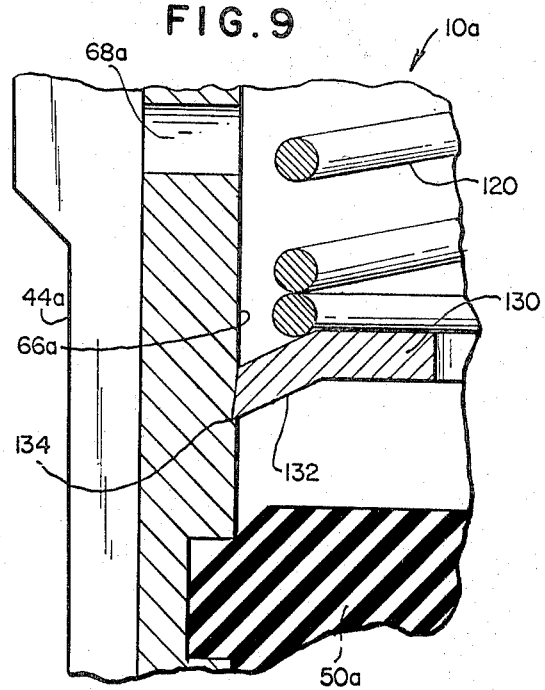

COMPENSATING PLUNGER FOR SOLENOID VALVE AND METHOD OF MAKING

This is a division of application Ser. No. 151,811, filed June 10, 1971, now U.S. Pat. No. 3,733,047.

BACKGROUND OF THE INVENTION

This invention relates in general to solenoid actuated fluid control valves and deals more particularly with an improved compensating plunger for an hydraulic control valve and a method for making same.

Compensating plungers have been provided for hydraulic valves of the aforedescribed type and such plungers usually include at least one movable insert assembly comprising a tubular shell supported for sliding movement in the plunger and containing an elastomeric insert for sealing engagement with an associated valve seat. A plunger of the aforedescribed type may also include a fixed insert which is retained in a stationary position in the plunger. In an hydraulic system substantial forces are often developed which may tend to draw or suck a movable insert out of its shell or to dislodge an associated stationary insert. For this reason, it is essential that insert assemblies for such installations have a high degree of insert retention capability. Heretofore, such insert assemblies have been provided with precision machined shells made from stainless steel or like material, and elastomeric inserts molded therein or otherwise forcibly assembled therewith. Forcible assembly of the elastomeric insert with an insert shell or plunger may, and often does, damage or otherwise deform the insert material thereby impairing its sealing capability. Where compression of the insert materials is relied upon for retention of the insert within the shell or plunger, internal stresses produced in the insert material tend to further impair the seating capability of the insert. For the aforesaid reasons, insert assemblies of the molded type are preferred, however, such insert assemblies are considerably more costly to produce and lack the insert retention characteristics of the forcibly assembled type. Accordingly, it is the general aim of the present invention to provide a compensating plunger for economical production and having improved sealing and insert retention characteristics, and to provide an improved method for making same.

SUMMARY OF THE INVENTION

In accordance with the present invention, a compensating plunger for a solenoid valve is provided which has improved insert retention capability. The plunger assembly includes at least one insert which is forcibly assembled therewith so that only a portion of the insert is retained under stress. The remaining or unstressed portion of the insert forms a seating surface for engaging an associated valve seat.

BRIEF DESCRIPTION OF THE DRAWINGS

FIG. 1 is a vertical sectional view through a solenoid actuated fluid control valve having a compensating plunger made in accordance with the present invention.

FIG. 2 is a somewhat enlarged vertical sectional view through the plunger of FIG. 1 taken along the line 2—2 of FIG. 1.

FIG. 3 is an exploded view of the plunger of FIG. 2 rotated 180° from its position in FIG. 2.

FIG. 4 is a somewhat further enlarged view illustrating a method for making a plunger insert assembly, the tools used in making the assembly being shown somewhat schematically and partially in section.

FIG. 5 is a vertical sectional view through another compensating plunger made in accordance with the present invention.

FIG. 6 is a sectional view taken along the line 6—6 of FIG. 5.

FIG. 7 is a sectional view taken along the line 7—7 of FIG. 5.

FIG. 8 is a somewhat enlarged fragmentary vertical sectional view of a portion of the plunger of FIG. 5.

FIG. 9 is a somewhat enlarged fragmentary vertical sectional view of another portion of the plunger of FIG. 5.

DETAILED DESCRIPTION OF THE PREFERRED EMBODIMENT

Turning now to the drawing and referring particularly to FIG. 1, a compensating plunger constructed in accordance with the present invention and indicated generally at 10 comprises part of a solenoid actuated fluid control valve indicated generally at 12. The valve 12 is particularly adapted for use in an hydraulic system and has a body 14 defining a chamber 16 containing the plunger 10. More specifically, the body 14 includes a hollow generally cylindrical base 18, an annular connecting nut 20 threadably received in the upper end of the base 18 and a generally cylindrical tubular sleeve 22 which is carried by the nut 18 and extends axially upwardly therefrom. The sleeve 22 is made from nonmagnetic material and has a generally cylindrical bore 24, the upper end of which is closed by a plug 26 welded or otherwise suitably secured thereto. A pair of diametrically opposed internally threaded horizontal fluid flow ports 28 and 30 in the base 18 are adapted to receive pipe connections or other fluid conduit fittings for connecting the valve 12 to an associated hydraulic system. The port 28 communicates with the chamber 16 through fluid passageways 32 and 34. An upwardly facing annular valve seat 36 coaxially aligned with the bore 24 surrounds the upper end of the passageway 34. The other port 30 is connected to the chamber 16 by a fluid passageway 38. Still another fluid passageway 40 extends downwardly through the plug 26 and has a downwardly facing annular valve seat 42 at its lower end coaxially aligned with the bore 24.

The plunger 10, hereinafter more fully described, has a generally cylindrical body 44 guided for axial sliding movement in the chamber 16 by the bore 24 which partially defines the latter chamber. The plunger contains a movable insert assembly 46, a compensating spring 48, and a fixed insert or plug 50 which retains the movable insert and the spring in assembly with the plunger. The spring 48 acts between the plug 50 and the movable insert 46 to bias the latter insert upwardly or toward the valve seat 42.

The plunger 10 is biased toward seating engagement with the valve seat 36 by a spring 52 which acts between the nut 20 and an annular flange at the lower end of the plunger body. An annular magnet coil 54 surrounds the sleeve 22. Preferably, and as shown, a housing 55 surrounds the magnet coil 54 and is retained in assembly with the body 14 by a connecting nut 56 which threadably engages the plug 26. The nut 56 has an internally threaded port 58 for receiving a pipe connection or other fluid conduit fitting for connecting the passageway 40 to an hydraulic system.

When the magnet coil 54 is in a de-energized state, the plunger 10 is biased to the position shown in FIG. 1 so that the plug 50 is in sealing engagement with the valve seat 36. The ports 30 and 58 are connected by the passageways 38 and 40 and chamber 16 so that fluid may flow therebetween. When the magnet coil 54 is energized, the plunger 10 is drawn upwardly in the bore 24 and into seating engagement with the valve seat 42 thereby sealing the passageway 40 and the port 58 against fluid flow thereto. When the plunger 10 is in the latter position, the ports 28 and 30 are connected by the passageways 32, 34 and 38 and the chamber 16 so that fluid may flow therebetween. The valve 12 and its operation have been generally described. However, for a more detailed description of a valve of this type, reference may be had to U.S. Pat. No. 3,307,129 to Mangiafico, issued Feb. 28, 1967, and entitled "Solenoid Operator for a Valve or the Like."

Considering now the plunger 10 in further detail and referring particularly to FIGS. 2 and 3, the plunger body 44 is made from magnetic material and has an annular flange 62 which surrounds one end thereof to provide a bearing surface for the spring 52. A plurality of axially extending radially outwardly opening grooves 64, 64 are formed in the plunger body to permit fluid to flow upwardly in the chamber 16 between the plunger 10 and the sleeve 22. A generally cylindrical bore 68 extends coaxially through the body 44 and openings 68, 68 formed in the body wall communicate with the bore 66 to provide for equilization of fluid pressure within the bore 66 and the chamber 16. The bore 66 has a reduced diameter portion 70 at one end thereof. An inwardly facing annular shoulder 72 provides transition between the main portion of the bore 66 and the reduced portion 70. At the other end of the bore 66 there is an annular recess 74 defined by an enlarged bore portion 76 and an outwardly facing annular shoulder 78. Another annular recess 80 is formed in the body wall spaced inwardly from the recess 74. The recess 80 is partially defined by an enlarged bore portion 82 and an inwardly facing annular shoulder 84. The plunger bore 66 also includes a conical transition portion 86 diverging inwardly from the annular shoulder 78 toward the recess 80.

The insert assembly 46 generally comprises a thin-walled tubular shell 88 containing an elastomeric insert 90. The shell 88 is made from flat metal, such as stainless steel, cut and drawn on an eyelet press or like machine and is adapted to be slidably received in the upper end of the plunger bore, as the plunger appears oriented in FIG. 2. It has an enlarged cylindrical portion 92, the outside diameter of which is substantially equal to the inside diameter of the main bore portion 66. It also has a reduced cylindrical portion 94 which has an outside diameter substantially equal to the diameter of the bore portion 70. A transitional portion 96 connects the cylindrical portions 92 and 94 and is adapted to engage and substantially complement the annular shoulder 72 when the insert is assembled with the plunger. The elastomeric insert 90 is received in and substantially complements an associated portion of the shell 88. It includes a cylindrical portion 98 and a somewhat larger cylindrical portion 100. The cylindrical portion 98 has a seating surface 95 and an outside diameter substantially equal to the inside diameter of the shell portion 94 in which it is received. Consequently, no substantial compressive stress is exerted upon the insert portion 98 by the associated shell portion 94 so that no substantial internal stresses are produced in the elastomeric insert material in the vicinity of the seating surface 95 to impair the sealing characteristics of the insert. The outside diameter of the cylindrical portion 100 is substantially greater than the inside diameter of the shell portion 92 which receives it. Thus, the cylindrical portion 100 is subjected to substantial compressive stress by the associated shell portion 92 which gives the insert assembly 46 great insert retention capability.

The insert assembly 46 is completed by forcibly inserting the insert 90 into the shell 88. Preferably, the insert portion 100 is compressed to reduce its diameter to at least equal the inside diameter of the cylindrical portion 92. The insert 90 is then inserted into the shell 88 while the insert portion 100 is maintained in compression.

A preferred method for assembling the insert in the shell is illustrated in FIG. 4. In accordance with this preferred method the shell is supported in a fixture 102, substantially as shown. A jig 104 having a generally conical opening 106 extending therethrough is then positioned adjacent the end of the enlarged portion 92. The opening 106 has a major diameter at least equal to and preferably somewhat greater than the diameter of the insert portion 100 before assembly. The minor diameter of the conical opening is at least as small as the inside diameter of the enlarged portion 92. Assembly is effected by applying a tool such as indicated at 107 to force the insert 90 downwardly through the opening 106 and into the shell 88, substantially as illustrated.

The plug 50, best shown in FIG. 3, is adapted for interlocking engagement with the body 44, provides a seating surface for the valve seat 36 and retains the insert assembly 46 and the spring 48 in assembly with the plunger as previously noted. It is preferably molded from elastomeric material for snap-fit engagement with the plunger body and has a radially outwardly projecting annular flange 108 adapted to be received in the annular recess 80 and partially defined by an axially outwardly facing annular shoulder 110 for engaging the inwardly facing shoulder 84. The inner end of the plug 50 has a truncated conical configuration for cooperating with the conical surface 86 to guide the plug into assembly with the plunger body 44. At its outer end, the plug 50 has another annular flange 112 adapted to be received in the recess 74 and partially defined by an axially inwardly facing annular abutment surface 114 for engaging the bearing surface 78 and a generally radially disposed outwardly facing seating surface 116. The outside diameter of the flange 112 is substantially equal to the inside diameter of the recess 74 so that substantially no internal stresses are developed in the flange portion of the plug to impair the sealing characteristics of the seating surface 116. In assembly, the plug surfaces 110 and 114, respectively, cooperate with the plunger body surfaces 84 and 78 to retain the plug and plunger in assembled relationship.

The plunger 10 is preferably assembled as illustrated in FIG. 3. The plunger body 44 is inverted so that the reduced bore portion 70 is positioned at the lower end thereof. The insert assembly 46 and the spring 48 may then be dropped into the bore 66. The conical bore portion 72 serves to guide the insert assembly 46 into a properly seated position. Thereafter, the plug 50 is forcibly inserted in the body 44 to complete the plunger assembly. If desired, an appropriate jig and fixture, such as illustrated in FIG. 4, may be provided to aid in assembly of the plug in the plunger body.

In a compensating plunger for an hydraulic valve or the like wherein a relatively high compensating spring force is employed, it is preferable that means be provided to prevent the compensating spring from bearing directly upon the elastomeric insert material. This arrangement prevents the compensating spring from deforming the insert material or causing internal stresses therein which may impair the sealing characteristics of the material. A compensating plunger of the latter type, made in accordance with the present invention, is illustrated in FIGS. 5–9 and indicated generally at 10a. The plunger 10a is similar in many respects to the plunger 10 and parts thereof which are substantially identical to parts previously described are identified by the same reference numeral and a letter a suffix and will not be hereinafter further described.

The plunger 10a has a body 44a and includes an insert assembly indicated generally at 118, a compensating spring 120 and a plug 50a. The spring 120 exerts a substantially greater biasing force than the spring 48 previously described.

The insert assembly 118 differs from the assembly 46 in the construction and arrangement of its thin-walled, tubular shell, designated by the numeral 122. The latter shell includes an enlarged portion 124, the inner edge of which is chamfered as indicated at 126 and best shown in FIG. 8. An elastomeric insert 90a received within the shell 122 is assembled therewith in the manner previously described so that no substantial internal stresses are developed by the insert in the vicinity of its seating surface 95a. The compensating spring 120 is prevented from bearing directly against the insert 90a by a bearing washer or disc 128 received within the enlarged portion 124 and bearing upon the chamfered edge 126. The spring 120 engages the bearing washer 128 which transmits biasing force to the shell 122 and isolates the insert 90a from direct contact with the spring 120.

In a like manner, the plug 50a is isolated from the spring 120 by a resilient retaining washer 130 received within the bore 66a between the spring 120 and the plug 50a. The washer 130 is preferably made from material harder than the material of the body 44a and includes a plurality of generally radially outwardly extending legs 132, 132. Each leg 132 is bent out of the plane of the washer 130 and in the direction of the plug 50a as by forcible insertion of the washer into the bore 66a through the plug end thereof. Each leg 132 has a sharp edge 134 thereon for incising the wall of the bore 66a so that the washer 130 grippingly engages the latter wall. It will be apparent that the biasing force exerted by the spring 120 causes the washer 130 to bite into the wall of the bore 66a, thereby preventing the spring 120 from exerting biasing force upon the plug 50a. In this manner, effective sealing engagement between the plug seating surface 116a and an associated valve seat is assured.

I claim:

1. A method for making a compensating plunger for a solenoid valve, said method comprising the steps of providing an axially elongated generally cylindrical plunger body, forming a stepped bore extending axially through said body and having a generally cylindrical main portion, one end portion having a diameter substantially smaller than the diameter of said main portion and a transitional portion between said main portion and said one end portion, forming a tubular shell adapted to be slidably received in said bore and including an enlarged portion adapted to be received in said main bore portion, a reduced portion adapted to be received in said one end portion and an intermediate portion therebetween for engaging said transitional portion, forming an elastomeric insert adapted to be received in said shell and including a generally cylindrical first portion having a diameter substantially equal to the inside diameter of said reduced portion and a generally cylindrical second portion having a diameter substantially greater than the inside diameter of said enlarged portion, forcibly inserting said insert into said shell so that said first portion is received in said reduced portion and said second portion is received in said enlarged portion whereby to form an insert assembly, inserting said insert assembly in said plunger bore so that said reduced portion is received in said one end portion and said enlarged portion is received in said main bore portion, inserting a spring in said main bore portion after inserting said insert assembly into said plunger bore, and forcibly inserting a plug in the opposite end of said plunger bore to retain said insert assembly and said spring therein.

2. A method for making a compensating plunger as set forth in claim 1 wherein the step of forming a tubular shell is further characterized as cutting and drawing an insert shell from flat metal.

3. A method for making a compensating plunger as set forth in claim 2 wherein the step of forming an elastomeric insert is further characterized as molding said insert from elastomeric material.

4. A method for making a compensating plunger as set forth in claim 1 wherein the step of forcibly inserting said insert is further characterized as compressing said second portion to reduce the diameter thereof to at least equal the inside diameter of said enlarged portion and inserting said insert while said second portion is so compressed.

5. A method for making a compensating plunger as set forth in claim 4 wherein the step of compressing said second portion is further characterized as providing a jig having a conical opening therethrough, said opening having a major diameter at least equal to the diameter of said second portion before assembly and a minor diameter at least equal to the inside diameter of said enlarged portion, positioning said jig with the minor diameter of said opening adjacent the enlarged end of said shell and in coaxial alignment therewith, and forcing said second portion through said opening and into said shell.

6. A method for making a compensating plunger for a solenoid valve, said method comprising the steps of providing an axially elongated generally cylindrical plunger body, forming a stepped bore extending axially through said body and having a generally cylindrical main portion, one end portion having a diameter substantially smaller than the diameter of said main portion and a transitional portion between said main portion and said one end portion, cutting and drawing a tubular shell from flat metal and adapted to be slidably received in said bore and including an enlarged portion adapted to be received in said main bore portion, a reduced portion adapted to be received in said one end portion and an intermediate portion therebetween for engaging said transitional portion, molding an elastomeric insert adapted to be tightly received in said shell and including a generally cylindrical first portion adapted to be received in said reduced portion and a generally cylindrical second portion adapted to be received in said enlarged portion, forcibly inserting said insert into said shell so that said first portion is received in said reduced portion and said second portion is received in said enlarged portion whereby to form an insert assembly, inserting said insert assembly in said plunger bore so that said reduced portion is received in said one end portion and said enlarged portion is received in said main bore portion, inserting a spring in said main bore portion after inserting said insert assembly into said plunger bore, and forcibly inserting a plug in the opposite end of said plunger bore to retain said insert assembly and said spring therein.

* * * * *